United States Patent [19]
Roth et al.

[11] Patent Number: 5,128,978
[45] Date of Patent: Jul. 7, 1992

[54] FILM HOLDER FOR AUTORADIOGRAPHIC IMAGING

[75] Inventors: Peter H. Roth; Frederick Slavitter, both of Needham, Mass.

[73] Assignee: Polaroid Corporation, Cambridge, Mass.

[21] Appl. No.: 763,344

[22] Filed: Sep. 20, 1991

[51] Int. Cl.⁵ .............................................. G03B 42/04
[52] U.S. Cl. .................................... 378/185; 378/169; 378/183; 250/475.2
[58] Field of Search .............. 250/475.1, 483.1, 485.1; 378/169, 183, 187, 185, 188, 182

[56] References Cited

U.S. PATENT DOCUMENTS

| | | | |
|---|---|---|---|
| 2,709,223 | 5/1955 | Bachelder et al. | 250/68 |
| 3,103,864 | 9/1963 | Erikson et al. | 378/169 |
| 3,330,953 | 7/1967 | Erikson | 378/169 |
| 3,788,205 | 1/1974 | Pasieka et al. | 95/93 |
| 3,804,625 | 4/1974 | Sorli | 378/183 |
| 3,854,812 | 12/1974 | Sorli | 354/312 |
| 4,019,194 | 4/1977 | Cutler, Jr. et al. | 354/312 |
| 4,186,308 | 1/1980 | Erikson | 250/480 |
| 4,258,263 | 3/1981 | Buldini et al. | 250/480 |
| 4,303,327 | 12/1981 | LaBelle et al. | 250/468 |
| 4,542,523 | 9/1985 | Erikson | 378/183 |

*Primary Examiner*—Janice A. Howell
*Assistant Examiner*—Don Wong
*Attorney, Agent, or Firm*—John J. Kelleher

[57] ABSTRACT

A film cassette designed to receive photosensitive film in a light protective envelope and maintain lighttight integrity while removing the protective envelope includes means for bringing a light emitting enhancer screen into intimate contact with the photosensitive film during exposure to x-ray photography. The back of the photosensitive film may be brought into intimate contact with a film or sheet of specimen-containing radioactive or radiation generating material.

12 Claims, 2 Drawing Sheets

FILM HOLDER FOR AUTORADIOGRAPHIC IMAGING

BACKGROUND OF THE INVENTION

1. Field of the Invention

This invention relates to large film cassettes for obtaining images on photosensitive film from radioactive or radiation emitting specimens and their use. A film cassette designed to receive photosensitive film in a light protective envelope and maintain lighttight integrity while removing the protective envelope includes means for bringing a light emitting enhancer screen into intimate contact with the photosensitive film during exposure to x-ray photography. The back of the photosensitive film may be brought into intimate contact with a sheet of specimen-containing radioactive or radiation generating material.

2. Description of the Prior Art

In large format radiography (e.g. 8×10 or 10×12) it is standard practice to load the film into a holder or cassette. The cassette, which is typically lighttight when loaded with film, facilitates storage, handling and processing of the film.

Cassettes have proven to be particularly useful in radiography using self-developing film. Daylight preloading of the cassette with the film handling convenience and relatively short time periods to prepare for exposure and processing are all highly desirable qualities. For x-ray applications the cassette preferably includes a light-enhancing screen or surface which has a layer of phosphors which emits visible light and ultraviolet light when exposed to radionucleotides including x-rays. The photosensitive layer of the film unit is held in close and continuous contact with the phosphor layer so that the x-ray induced light of phosphors intensifies the image to be recorded on the film.

In the science of audioradiography, specimen sheets which have been provided with a radioactive material are presently inserted directly into film cassettes designed for x-ray photography. This operation is presently done in a darkroom to prevent fogging (partial exposure) of the x-ray film. Such sheets may consist of the product of electrophoresis gel separation of cell tissues into varying molecular weights. The products of such separation are treated with radioactive isotopes or elements which have an affinity for the specimen (i.e. such as an affinity for DNA pairings). Such gels are transferred to a membrane and dried. Although the radiation level is low a desired photographic image may be obtained in an x-ray cassette.

SUMMARY OF THE INVENTION

The present invention proposes a manually portable cassette or film holder within which an audioradiographic generated image may be formed in a lighttight environment on a large format x-ray sensitive film. A particularly useful holder for this purpose includes a housing having a base section and a cover section pivotally attached thereto which may be opened and closed like a book when connectors located along an edge of the cover section are manually engaged or disengaged. The base section and cover section of the film holder collectively form a lighttight cavity or exposure chamber.

An intensifier screen is mounted within the film holder cover section with its radiation intensifying surface facing inwardly of the film holder. Manually depressing the external center portion of the cover section moves said center portion, and the intensifier screen supported thereon toward the closed film holder base section where it becomes latched in this depressed position. When so latched, a latch release member will move outwardly of one end of the film holder. The external center portion of the cover section may be unlatched, such that it returns to its original non-depressed position, by depressing the outwardly extending latch release member toward the housing cover section from which it projects.

The x-ray sensitive film is preferably in the form of a conventional self-developing film unit which includes, in part, a sheet of x-ray sensitive film enclosed within a removable light-excluding, opaque envelope.

The envelope enclosed film is placed within the film holder such that one end thereof is hooked over an extending tab attached to one end of an inner surface of the film holder base section and such that its photosensitive surface faces the intensifier screen when the film holder is in a closed condition. After the film holder is closed, the film-enclosing envelope may be withdrawn from one end thereof, without also withdrawing the film therefrom, because the above-noted tab maintains the film within the lighttight film holder as the envelope is being withdrawn.

The film holder base section additionally includes an access panel which allows for the placement of a custom made sheet of specimen-containing radioactive or radiation generating material in contact with the non-photosensitive surface of the film without subsequently damaging said specimen-containing sheet of material. The envelope enclosing the x-ray film must be removed therefrom so that a specimen image can be transferred thereto. If the specimen-containing sheet is placed on top of the envelope and the envelope is subsequently removed from the enclosed x-ray film, the specimen-containing sheet may be damaged by the frictional forces that are produced therebetween during the envelope removal process.

However, the film cassette of the present invention is constructed such that the opaque envelope enclosing the x-ray film may be removed therefrom without exposing a photosensitive surface thereof to ambient light when the cassette access panel is subsequently opened in ambient light for placement of the specimen-containing sheet material against the non-photosensitive surface of the x-ray film. By being able to place the sheet of specimen-containing material against the non-photosensitive surface of the x-ray film without exposing the opposite of photosensitive side to ambient light avoids the movement of an x-ray film enclosing opaque envelope while the specimen is in place.

The access panel in the base section is latched or unlatched by sliding a pair of cammed metal rails, located along opposite sides of the film holder in one direction or another. After the opaque envelope enclosing the x-ray sensitive film has been removed, and the sheet of specimen-containing radioactive material has been placed within the film holder in, for example, daylight, the above-mentioned center portion of the housing cover section is depressed and is automatically latched in its depressed position, as explained above, to thereby place the x-ray sensitive surface of the film in pressing intimate contact with the intensifier screen and the sheet of specimen-containing material in pressing intimate contact with the opposite or non-photosensitive surface of said x-ray sensitive film.

The radioactive material is the sole source of the energy which is employed to form an image of the specimen on the x-ray film in a period of time that may take anywhere from minutes to days. X-rays or high energy electrons from the radioactive material pass through the nonsensitive surface of the film, cause image-containing visible light to be emitted by the intensifier screen and are then reflected back onto the sensitive surface of the film where a specimen image is ultimately formed.

Some specimen images must be formed in the cassette at extremely low temperatures, such as at a temperature of −80 degrees centigrade, in order to eliminate normal loss due to low intensity reciprocity failure. Exposure to such temperatures will cause cassette dimensions to change and if all cassette dimensions do not change equally, the cassette may bend or fracture to the point where ambient light may enter the cassette, fog the enclosed film and thereby render the film useless. If the entire cassette is made from the same material, all of the cassette dimensions will change by the same amount so that no cassette bending or cracking will result. However, if as in the cassette of the present invention the components parts thereof are made from different materials, cassette bending or cracking that would otherwise occur is presented by employing cassette materials having more or less the same coefficient of thermal expansion. For example, in the present cassette certain inner components are formed of steel and certain outer components are formed of a thermoplastic reinforced resin having a coefficient of thermal expansion approximately equal to that of steel, a resin which is sold by General Electric Company of Pittsfield, Mass. under their registered trademark Valox 9335.

When exposure is complete, the radioactive sheet material is removed and then the film holder is placed in a conventional processor where the exposed negative is mated with a positive sheet having a pod of developer liquid attached thereto wherein self-developing processing is initiated. After the developing process is complete, the positive and negative sheets are peeled apart, thereby leaving a visible image on the positive sheet.

Objects of the invention not clear from the above summary will be more fully understood from the following detailed description of a preferred embodiment thereof and a review of the accompanying drawings.

BRIEF DESCRIPTION OF THE PREFERRED EMBODIMENT

Figure 1:
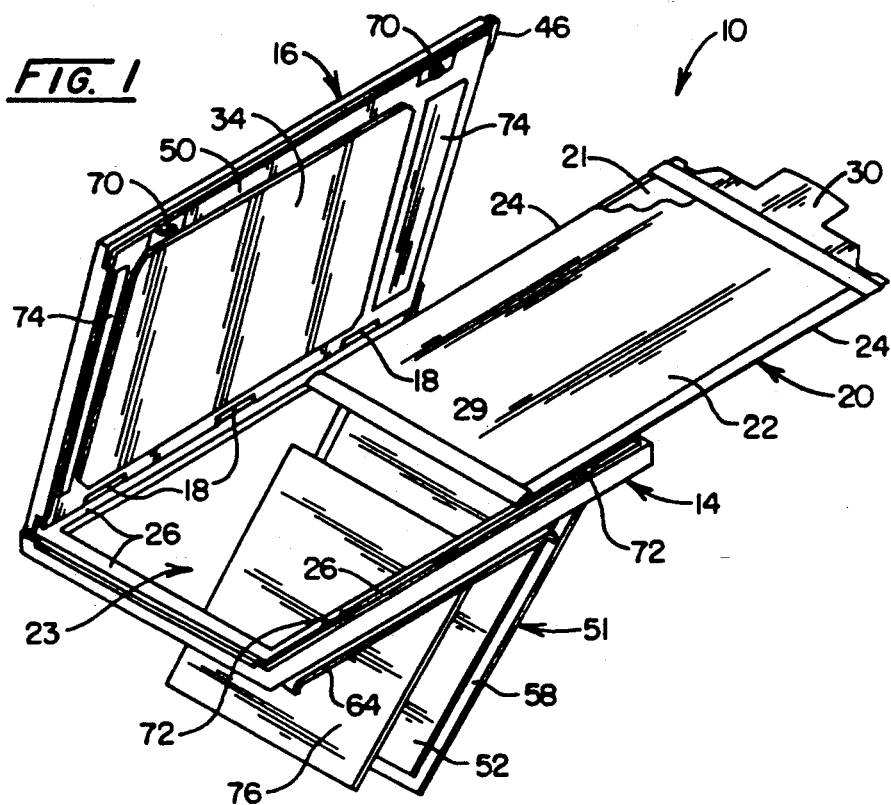
FIG. 1 is a perspective view of a cassette embodying the instant invention, shown in its open position, showing a film unit for use therein and a specimen sheet for imaging thereon.

Referring to FIG. 1, cassette 10 comprises a housing consisting of a base section 14 and a cover section 16. These two sections are generally rectangular in shape and are hinged together along one edge of each section as shown by hinges 18 so that the sections 14 and 16 may open and close to receive film assemblies such as film assembly 20.

Film assembly 20 consists of an opaque envelope 22 containing a photographic film 21. Film assembly 20 is positioned in the base section 14 so that the side edges 24 of an envelope 22 and the film 21 within are seated on base sealing surfaces 26 which are a sponge rubber supported thermoplastic reinforced resin sheet. These sealing surfaces extend around the periphery of a window or opening 23 in the bottom of the base section 14 and serve to seal the assembly from light penetration as will be more fully explained hereinbelow.

Figure 2:
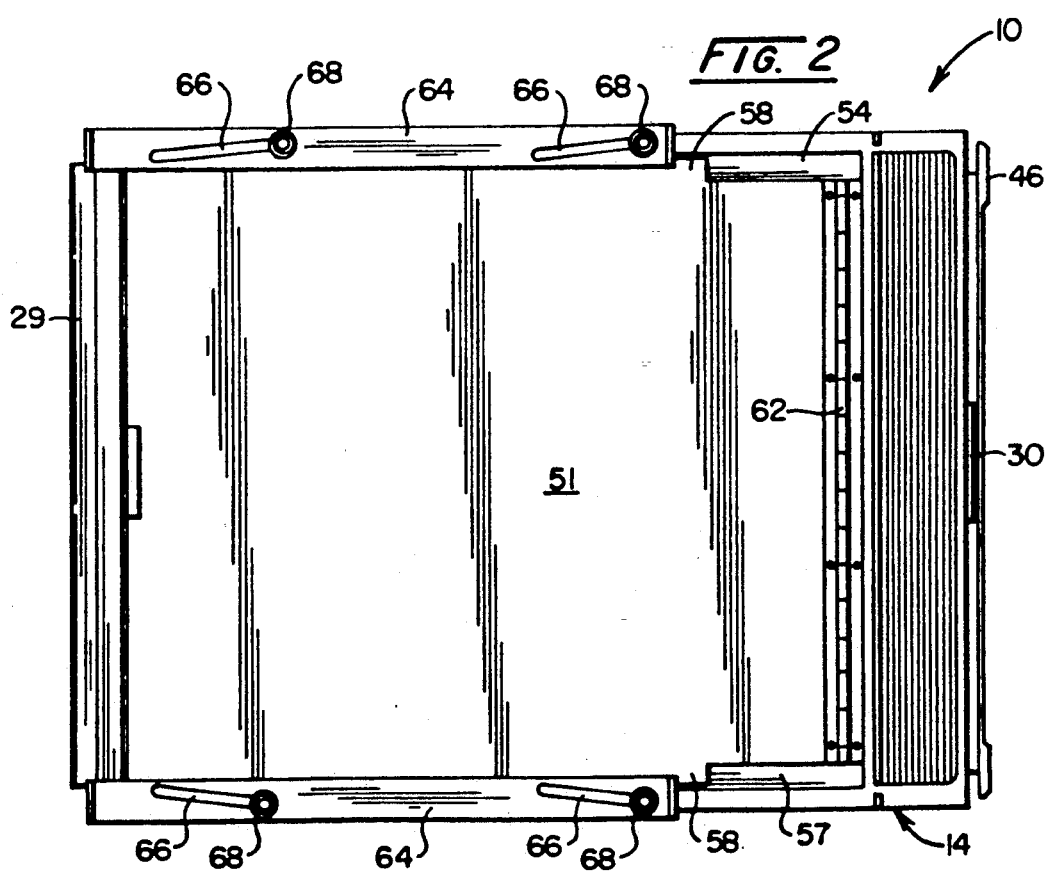
FIG. 2 is a bottom plan view of the cassette showing the access panel covering the access window and with a film assembly positioned therein.

One end 29 of envelope 22 extends beyond section 14 and the cassette 10 in its closed position (see FIG. 2). Tab 30 of film assembly 20 is an integral part of film 21 and folds inwardly over a rigid tab extending within base 14 (not shown).

Figure 3:
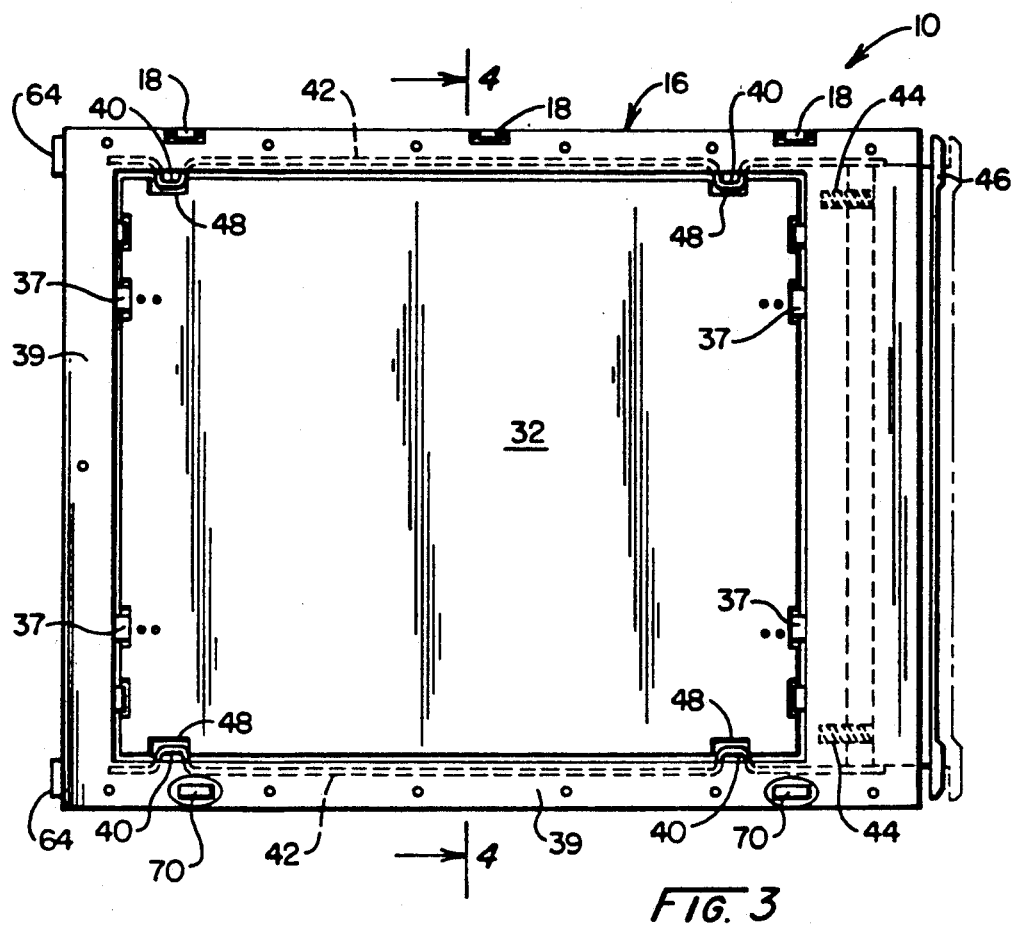
FIG. 3 is a top plan view of the cassette showing the pressure panel in its unlatched position and with the protective envelope of the film assembly removed.
Figure 4:
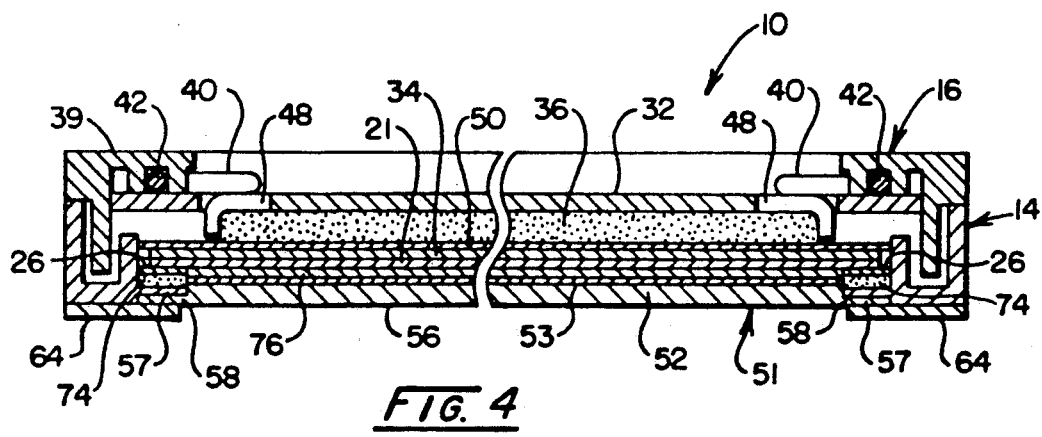
FIG. 4 is a cross sectional view of the cassette as seen along the line 4—4 of FIG. 3 except showing the pressure panel in its depressed and latched position.

Cover section 16 is comprised of an externally and centrally positioned pressure plate 32 (see FIGS. 3 and 4) which is disposed to more inwardly or outwardly against a resilient rubber foam pad 36 and spring members 37 attached to the surfaces 39 of section 16 (see FIGS. 3 and 4). Light enhancing screen 34 mounted adjacent pressure plate 32 faces inwardly so as to face film assembly 20 and more importantly film 21 within the assembly after the envelope 22 is removed so that pushing against pressure plate 32 urges light enhancing screen 34 inwardly against film 21.

Pressure plate 32 is latched or locked in its depressed position by tabs 40 which are an integral part of rods 42 that extend along either side of section 16 to a release bar 46 at one end. Bar 46 and rods 42 are spring biased by springs 44 to urge such rods in the direction of the attached latch release bar 46, thereby causing the bar to be extended beyond the section 16 with the springs in a relatively relaxed position. When the plate 32 is in its non-depressed position tabs 40 extend into matching notches 48 formed in the sides of the plate 32. In this position springs 44 urge bar 46, rods 42 and tabs 40 in the direction of the bar 46 but are restrained by the sides of the notches 48. However, when plate 32 is depressed or pushed down, springs 44 and rods 42 cause the tabs 40 to extend above and beyond the notches 48 and effectively latch the plate 32 in its down or depressed position (see in particular FIG. 3 which shows plate 32 in a non-depressed position and the depressed position in dotted outline). Such plate 32 may be unlatched to return to its non-depressed position by simply pushing bar 46 in an inward direction to effect a matching of tabs 40 with notches 48.

A thermoplastic reinforced resin sheet 50 is attached to foam pad 36 and extends beyond the pad to the periphery of section 16 to act as a light sealing surface which extends around the periphery of section 16 and seals the cassette from light penetration in cooperation with the sealing surfaces 26 of section 14. Light enhancing screen 34 is attached to the sheet 50 but is of a size to generally match film 21.

Base section 14 of the cassette 10 normally is provided with an integral cover but in the cassette of the present invention a rectangular access opening or window 23 opens into the cassette. An access panel 51 is formed with an inner extended surface 52, that is of substantially the same dimensions as the window 23, and an outer surface 56, the sides and one end of which extend beyond the surface dimensions of window 23. When seated on the outer surface of section 14 (see FIGS. 2 and 4) surface 52 protects within window 23 while the edges 58 of surface 56 seat on the sides 57 of section 14. A thermoplastic reinforced resin sheet 53 covers the inner surface of surface 52 to provide a suitable surface to contact film 21 and/or the specimen sheet 76. The leading edge of surface 52 of panel 51 which extends beyond the surface 56 may be attached to section 14 by a hinge (shown at 62, in FIG. 2) in which even the panel 51 is pivotally opened or closed.

Elongated rails 64 are positioned on either side of and parallel to window 28. Such rails are provided with angled elongated slots 66. The slots of each rail are similarly angled. Four cam members 68 attached to the surface of section 14 extend through the slots 66. After positioning panel 51 in window 23 as herein described such panel may be secured to section 14 bu pushing rails 64 in the direction away from hinge 62, to the left as shown in FIG. 2, in which event the rails extend over panel 51 to both firmly attach it to the section 14 and to seal window 28 against light.

Sections 14 and 16 are provided with attachment latches 70 and 72 which serve to secure the members when the assembly is closed. Felt pads such as those shown at 74 may be provided to assist the sealing of the assembly from light penetration when the assembly is closed.

In operation the assembly is opened as shown in FIG. 1 (although panel 51 will be normally secured to enclose window 23). Film assembly 20 is inserted so that edge 29 of the protecting envelope 22 extends beyond the cassette to the left as shown in FIG. 2 but the film 21 is totally within the cassette with its edges all extending over the surrounding sealing surfaces. Tab 30 of the film 21 is crimped over a corresponding fixed tab (not shown) attached to section 14. The cassette is then closed and latched with latches 70 and 72. The assembly is now lighttight because of the sealing effects of the thermoplastic reinforced resin sealing surfaces 26 and 50 and felt pads 74. The protecting envelope 22 is extracted by pulling on the edge 29 which extends beyond the edge of the closed cassette, the thermoplastic reinforced resin sealing surfaces 26 and 50 and felt pads 74 maintaining light integrity. Tab 30 causes the film 21 to be retained in the cassette as the envelope 22 is removed. The panel 51 may now be removed because the photosensitive side of film 21 is facing the surface of intensifying screen 34. The bottom surface of film 21 is opaque so that light impinging thereon may not further penetrate the cassette. The thermoplastic reinforced resin sealing surfaces 26 and 50 prevent light impingement from around film 21. It may be desirable to depress the pressure panel 32 into its latching position before opening panel 51 since such added pressure may enhance the sealing effects of the thermoplastic reinforced resin and felt pad seals. In any event, subsequent to opening the panel 51 a sheet such as the audioradiographic specimen sheets described above and shown as 76 (see FIGS. 1 and 4) may be inserted into the accessed area of the back or non-photosensitive side of the film 21. The panel 51 is now preferably replaced to form the assembly as shown by FIG. 4.

Radiation or energetic electrons from the specimen sheet 76 have much the same effect as normal x-ray radiation on the film 21 although, since weaker, imaging may take longer. Such rays penetrate the film 21 to strike the screen 34 which generates light to image the photosensitive side of the film. Once imaging has taken place the panel 51 may be opened and the specimen 76 removed. The panel 51 may then be replaced and the film 21 inserted into a conventional film processor (presuming that the film is of the self developing type). Such processors are described in U.S. Pat. Nos. 3,788,205 to Pasieka et al; 3,854,812 to Sorli and 4,019,194 to Cutler et al and to the extent necessary for a full understanding of this invention are incorporated herein by reference.

U.S. Pat. No. 4,303,327 to LaBelle et al substantially describes the cassette of the present invention with the exception of its novel features of the window 23, panel 51 and associated structures and advantages. For the purpose of clarifying the descriptions set forth above this patent is hereby incorporated by reference herein in its entirety.

The concept of the present invention is applicable to all cassettes of the type of the preferred embodiment described above including those described in U.S. Pat. Nos. 4,186,308 to Erikson; 2,709,233 to Bachelder et al; 3,103,864 to Erikson et al; 3,330,953 to Erikson and 4,258,263 to Buldini et al and to the extent necessary for a full understanding of this invention are incorporated herein by reference.

While certain preferred embodiments of the present invention have been disclosed in detail, it is to be understood that various modifications may be adopted without departing from the spirit of the invention or scope of the following claims.

What is claimed:

1. A cassette for holding photographic film for radionucleotide exposure and imaging comprising:
    (a) a housing formed with at least two substantially parallel opposing surfaces and provided with means to receive therein a light excluding, envelope-enclosed x-ray film having a photosensitive surface and an opaque non-photosensitive surface, between said opposed surfaces, means for maintaining lighttight conditions within said housing after receiving said film, means for maintaining said lighttight conditions within said housing while removing the light excluding envelope from said film, a light enhancing screen located in juxtaposition to the photosensitive surface of said film and means for urging said light enhancing screen and photosensitive surface together;
    (b) means for accessing at least a portion of the non-photosensitive surface of the x-ray film; and
    (c) means for sealing the non-photosensitive surface of the x-ray film to said housing to maintain the lighttight integrity within said housing so that a sheet of radiation emitting specimen-containing material may be brought into intimate contact with the accessed portion of the non-photosensitive surface of said film.

2. The cassette of claim 1, wherein the means for accessing comprises an opening in the surface of said housing opposite said screen so as to expose at least a portion of the non-photosensitive surface of a photographic film positioned therein.

3. The cassette of claim 2 wherein an access panel is disposed to cover said opening and means are provided to attach and detach said panel to said housing surface so that a sheet of radiation emitting specimen-containing material may be positioned against the opaque non-photosensitive surface of said film and the panel may be attached to contain said specimen-containing material.

4. The cassette of claim 3 wherein means are provided to urge said access panel against said sheet of specimen-containing material and film to increase the intimate contact between said material and said film.

5. The cassette of claim 4 wherein the parallel surfaces of said housing, said opening and said access panel are generally rectangular in shape.

6. The cassette of claim 5 wherein said access panel is latched or unlatched to said housing surface by sliding a pair of slotted metal rails, positioned along opposite sides of said rectangular opening along cams attached to said housing surface and positioned to urge the panel towards said housing surface when pushed in one direction and away from said housing surface when pushed in the other direction.

7. The cassette of claim 1 wherein the parallel surfaces of said housing are generally rectangular in shape and said housing is formed from two horizontal sections hinged together along one side and disposed to pivotally open and close, said light enhancing screen being mounted in one said section and a photographic film supporting surface being provided in the other said section, and said means for accessing comprises a rectangular opening in the surface of the section containing the film supporting surface.

8. The cassette of claim 7 wherein the means for urging the light enhancing screen and photosensitive surface together comprises a panel mounted in an opening in the surface of the section with the light enhancing screen and disposed to move inwardly to urge said screen against the photographic film including means to latch said panel in the position to urge said screen against said photographic film.

9. The cassette of claim 8 wherein a rectangular access panel is disposed to cover said rectangular opening and means are provided to attach and detach said panel so that a sheet of radiation emitting specimen-containing material may be positioned against the opaque non photosensitive surface of the film and the panel attached to contain said specimen-containing material.

10. The cassette of claim 9 wherein means are provided to urge said access panel against the sheet of specimen-containing material and the film to increase the intimate contact between said material and said film.

11. The cassette of claim 10 wherein said access panel is latched or unlatched to said housing surface by sliding a pair of cammed metal rails, positioned along opposite sides of said rectangular opening along cams attached to said housing surface and positioned to urge the panel towards said housing surface when pushed in one direction and away from said surface when pushed in the other direction.

12. The cassette of claim 1 wherein said cassette is formed of a plurality of component parts wherein at least one of said parts is constructed of a first material, another of said parts is constructed of a second material which is different from said first material and said first and second materials have approximately the same coefficient of thermal expansion.

* * * * *